United States Patent
Yun et al.

(10) Patent No.: US 9,061,637 B1
(45) Date of Patent: Jun. 23, 2015

(54) HYBRID CRASH BOX FOR VEHICLE

(71) Applicant: Hyundai Motor Company, Seoul (KR)

(72) Inventors: Hye Rim Yun, Suwon-si (KR); Kyung Tae Kwak, Gunpo-si (KR); Seung Gu Kim, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/246,490

(22) Filed: Apr. 7, 2014

(30) Foreign Application Priority Data

Dec. 5, 2013  (KR) .......................... 10-2013-0150419

(51) Int. Cl.
*B60R 19/34* (2006.01)
*B60R 19/26* (2006.01)

(52) U.S. Cl.
CPC ........... *B60R 19/26* (2013.01); *B60R 2019/264* (2013.01); *B60R 19/34* (2013.01)

(58) Field of Classification Search
CPC ........ B60R 19/34; B60R 19/26; B60R 19/18; B60R 19/36; B60R 2019/26; B60R 2019/264
USPC .................................. 293/133, 155
See application file for complete search history.

(56) References Cited

U.S. PATENT DOCUMENTS

| 4,190,276 A | * | 2/1980 | Hirano et al. ................. 293/133 |
| 8,336,933 B2 | * | 12/2012 | Nagwanshi et al. .......... 293/132 |
| 2004/0051321 A1 | * | 3/2004 | Hanai et al. ................... 293/132 |

FOREIGN PATENT DOCUMENTS

| EP | 1473197 | * 11/2004 |
| JP | 11-255049 A | 9/1999 |
| KR | 10-2010-0049305 A | 5/2010 |
| KR | 10-2010-0104457 A | 9/2010 |
| KR | 10-2013-0068415 A | 6/2013 |
| KR | 10-2013-0099162 A | 9/2013 |

* cited by examiner

*Primary Examiner* — Dennis H Pedder
(74) *Attorney, Agent, or Firm* — Morgan, Lewis & Bockius LLP

(57) ABSTRACT

Provided is a hybrid crash box for a vehicle that includes a latticed box pipe connected with a bumper beam and a mount mounted on a bumper stay. The latticed box pipe may include a metallic hollow pipe and plastic lattices integrally formed in the hollow pipe by injection molding. A plurality of holes that contract against a shock may be formed at predetermined positions through the hollow pipe. Configuration of the holes, including shape, number and position, may be determined by the hollow pipe which depends on the type of the vehicle.

3 Claims, 4 Drawing Sheets

HYBRID CRASH BOX FOR VEHICLE

CROSS-REFERENCE TO RELATED APPLICATIONS

The present application claims priority of Korean Patent Application Number 10-2013-0150419 filed on Dec. 5, 2013, the entire contents of which application are incorporated herein for all purposes by this reference.

BACKGROUND OF INVENTION

1. Field of Invention

The present invention relates to a hybrid crash box for a vehicle, and more particularly to a hybrid crash box for a vehicle which is made of a hybrid material including steel and plastic and can easily attenuate a shock in a low-speed or high-speed collision.

2. Description of Related Art

Generally, the front and the rear of vehicles are equipped with bumper assemblies that can protect pedestrians and occupants at the time of vehicle collisions by absorbing shock energy.

Referring to FIG. 1, a bumper assembly 10 includes bumper stays 11 connected with the side members of a car body, a bumper beam 12 coupled to the front ends of the bumper stays 11, an energy absorber 13 mounted on the front of the bumper beam 12 and absorbing shock energy applied to the car body, and a bumper cover 14 covering the energy absorber 13 and forming the external appearance. Further, crash boxes 20 that can minimize damage to a vehicle by absorbing a shock in a low-speed collision are disposed between the bumper stays 11 and the bumper beam 12.

The structure of a crash box according to an example of the related art is described hereafter with reference to FIG. 2. A crash box 20 according to an example of the related art is made of pure metal (steel) and composed of a hollow corrugated pipe 22 that is a front part and mounted on a bumper beam and a flat mount 24 that is a rear part and mounted on a bumper stay.

In particular, the hollow corrugated pipe 22 has a concavo-concave structure with ridges and grooves repeatedly formed in the longitudinal direction, and a plurality of concave beads is formed at regular intervals, when seen from the outside. Accordingly, the beads 26 of the hollow corrugated pipe 22 absorb a shock by contracting in a collision.

However, since the crash box according to an example of the related art is made of steel, the thickness necessarily increases to cope with a collision and the increase in thickness increases the weight.

Further, as another example of the related art, a crash pad made of pure metal with a lattice-shaped internal structure is disclosed in Korean Patent Publication No. 2013-68415, but similarly, it is made of steel and causes the thickness and weight to increase.

A composite hybrid crash box including steel and plastic has been proposed to solve those problems. As shown in FIG. 3, a hybrid crash box 30 is composed of a latticed box pipe 32 that is a front part and mounted on a bumper beam and a flat mount 34 that is a rear part and mounted on a bumper stay.

In particular, the latticed box pipe 32 is composed of a hollow pipe 36 made of metal (steel) and lattices 38 made of plastic by injection molding and crossing each other horizontally and vertically in the hollow pipe 36.

There is no bead specifically formed in the metallic hollow pipe 36 of the latticed box pipe 32 and the reason is because if beads are formed on the hollow pipe 36 in injection molding of the metallic hollow pipe 36 and the plastic lattices 38 by a mold, the product cannot be drawn out due to undercut on the mold.

Since no specific bead is formed on the metallic hollow pipe 36 of the latticed box 32, as described above, the allowable load for absorbing a shock (a shock load for contraction of the hollow pipe) increases and the performance of absorbing a shock decreases.

As shown by the load-displacement graph in FIG. 4, since no specific bead is formed on the metallic hollow pipe 36 of the latticed box 32, a load (over 300 kN) higher than the standard level (about 150~170 kN) of the allowable load for absorbing a shock is generated.

Therefore, in a low-speed collision, not only the crash box cannot contract well against a shock due to a high allowable load, but also the shock in a collision is transmitted even to the side members connected with the bumper stays in addition to the bumper stays behind the crash box, without the crash box contracting, such that the side members are deformed.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a hybrid crash box for a vehicle which is enabled to absorb a shock well by decreasing an allowable load for absorbing a shock in a collision, by forming holes through a metallic hollow pipe, which has been formed integrally with plastic lattices by injection molding, to make the holes be contracted by the shock like beads.

Various aspects of the present invention provide a hybrid crash box for a vehicle which includes a latticed box pipe connected with a bumper beam and a mount mounted on a bumper stay, in which the latticed box pipe includes a metallic hollow pipe and plastic lattices integrally formed in the hollow pipe by injection molding, and a plurality of holes that contract against a shock are formed at predetermined positions through the hollow pipe.

The holes may be formed in a shape or shapes of polygons at substantially regular intervals through two or more sides selected from top, bottom, left, and right sides of the hollow pipe. The holes may be formed in a shape or shapes of slots vertically elongated, substantially perpendicular to a front-rear longitudinal direction of the hollow pipe. The slots may be divided into straight section holes formed through top, bottom, left, and right sides of the hollow pipe and curve section holes elongated up to rounded edges that are joints of the top, bottom, left, and right sides.

Width, length, number, and position of the holes may be determined by size and shape of the hollow pipe which depends on the type of the vehicle.

The present invention provides various advantages. First, it is possible to achieve a smooth shock-absorbing operation of a crash box by forming holes through a metallic hollow pipe, which has been formed integrally with plastic lattices by injection molding, to make the holes be contracted by the shock like beads.

That is, by forming a plurality of slots contracting against a shock through the metallic hollow pipe of the crash box, it is possible to decrease an allowable load for absorbing a shock in a collision lower than the existing levels, and it is also possible to achieve a smooth shock-absorbing operation even against a shock in a low-speed collision with the decrease of the allowable load.

Second, since it is possible to reduce the weight of the crash box as much as the number of holes formed through the metallic hollow box, it is possible to reduce the weight and improve fuel efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
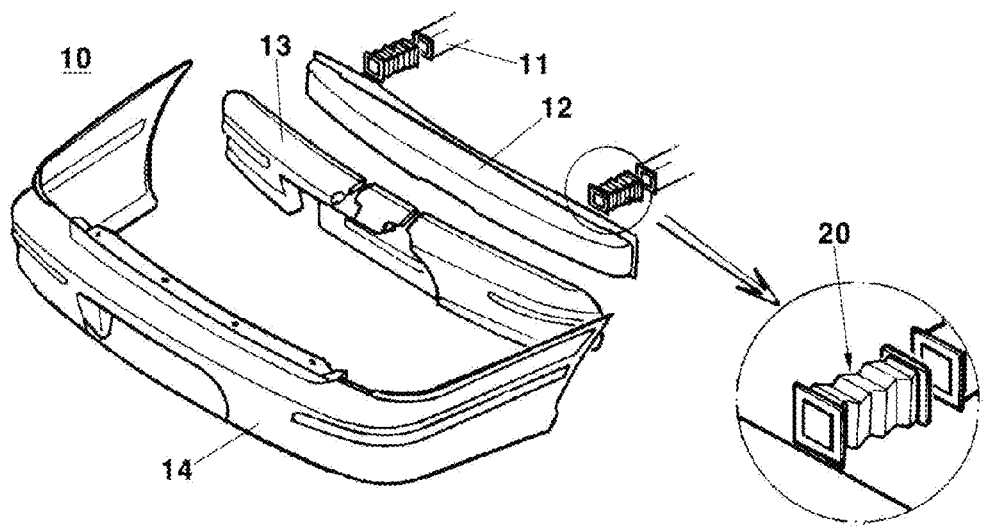
FIG. 1 is a schematic view showing the configuration of a bumper assembly.
Figure 2:
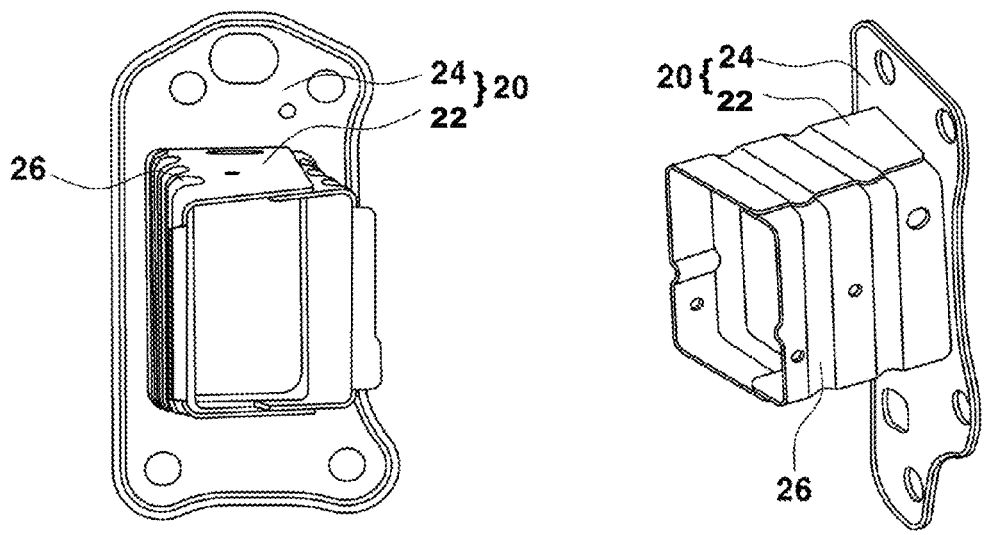
FIG. 2 is a perspective view showing a crash box according to an example of the related art.
Figure 3:
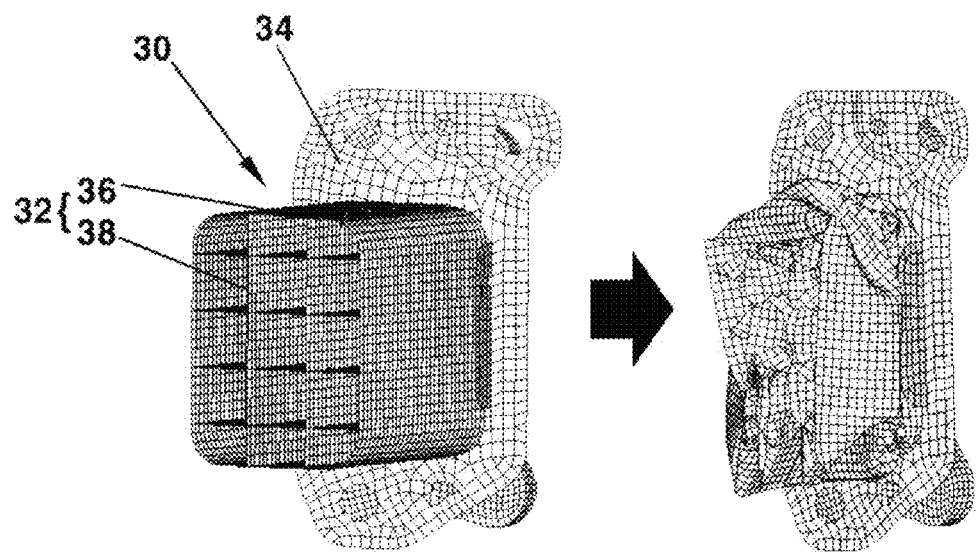
FIG. 3 is a perspective view showing a crash box according to another example of the related art.
Figure 4:
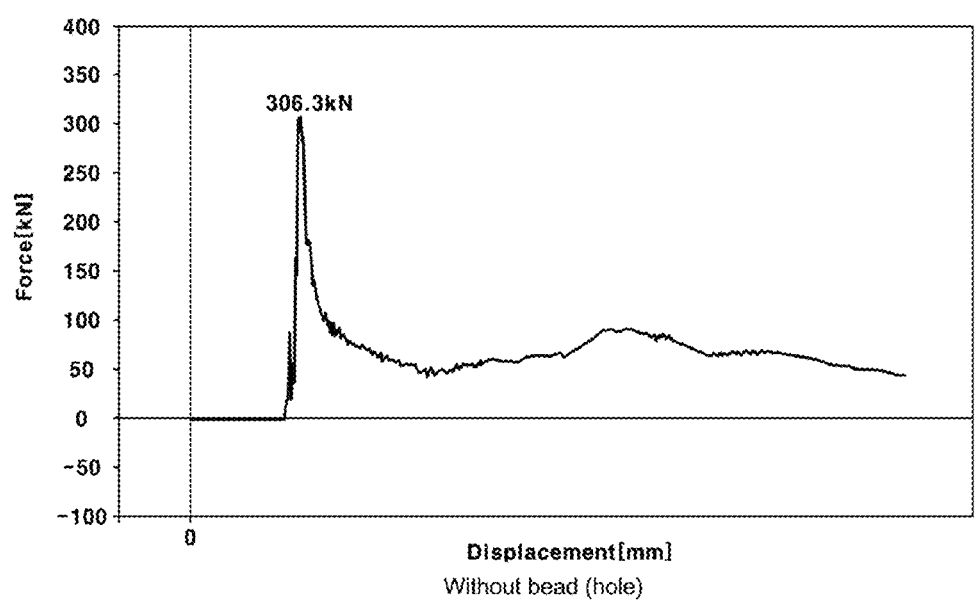
FIG. 4 is a graph showing an allowable load for absorbing a shock of the crash box according to another example of the related art.
Figure 5:
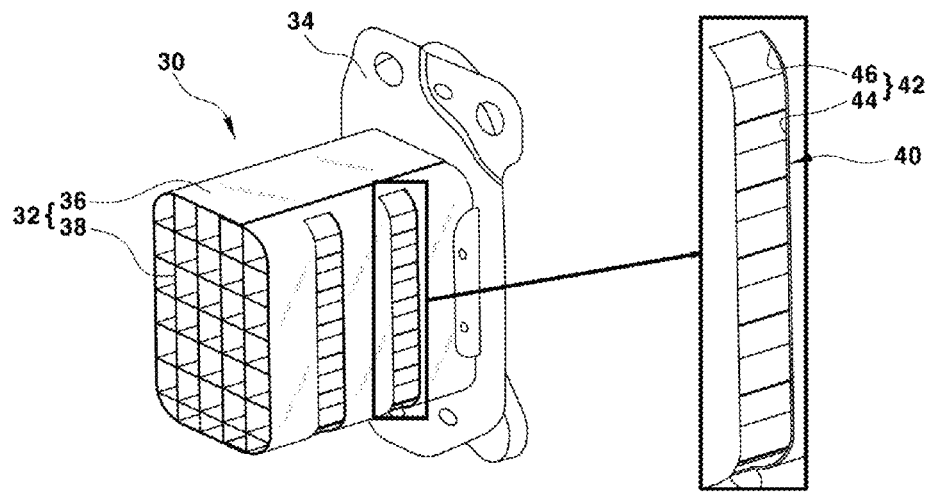
FIG. 5 is a perspective view showing an exemplary hybrid crash box for a vehicle according to the present invention.

FIG. 5 is a perspective view showing a hybrid crash box according to various exemplary embodiments of the present invention. As shown in FIG. 5, a hybrid crash box 30 of the present invention includes a latticed box pipe 32 that is a front part and mounted on a bumper beam and a flat mount 34 that is a rear part and mounted on a bumper stay.

In particular, the latticed box pipe 32 includes a hollow pipe 36 made of metal (e.g. steel) and having a substantially rectangular cross-section or the like and lattices 38 made of plastic by injection molding and formed by vertical and horizontal plates crossing each other in the hollow pipe 36. The hollow pipe 36 has a plurality of edges, such as four edges, rounded to easily contract and distribute a shock in a collision.

In particular, according to various exemplary embodiments of the present invention, a plurality of holes 40 that contracts against a shock is formed through the metallic hollow pipe 36, at regular intervals or substantially regular intervals at predetermined positions.

The shape of the holes 40 is not limited and they may be formed in various polygonal shapes (rectangle, ellipse, and wave) that can be contracted by a shock. Further, the width, length, number, and positions of the holes 40 may be made different in consideration of the size and shape of the hollow pipe 36 which depend on the designs of vehicles.

Preferably, the holes 40 are formed at two sides selected from the top, bottom, left, and right sides of the hollow pipe 36, and more preferably, the holes 40 are formed at the left and right sides of the hollow pipe 36 in consideration of an allowable load against a shock.

As an exemplary embodiment of the present invention, the holes 40 are formed through the hollow pipe 36 in the shape of slots 42 elongated in the up-down direction perpendicular to the front-rear longitudinal direction of the hollow pipe 36. For example, a plurality of slots 42 is formed through the left and right sides of the hollow pipe 36, at regular intervals in the front-rear direction, and perpendicular to the front-rear longitudinal direction of the hollow pipe 36 to contract in several steps for absorbing a shock.

In detail, the slots 42 are divided into straight section holes 44 formed through the flat top, bottom, left, and right sides of the hollow pipe 36 and curve section holes 46 formed up to the rounded edges that are the joints of the top, bottom, left, and right sides.

Figure 6:
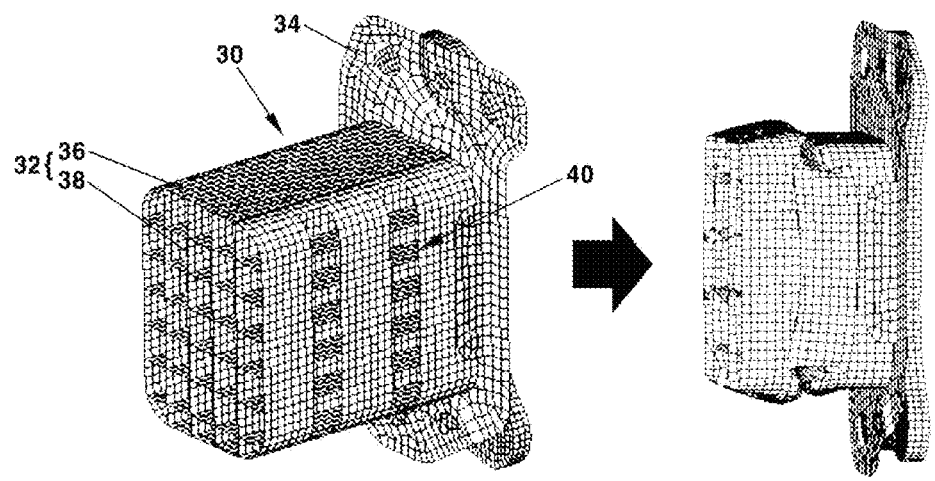
FIG. 6 is a perspective view showing the operation of absorbing a shock of an exemplary hybrid crash box for a vehicle according to the present invention.

When a shock is applied to the hybrid crash box of the present invention, which is manufactured in the structure described above, in a collision, as shown in FIG. 6, the plastic lattices 38 in the hollow pipe 36 are crushed while absorbing the shock and simultaneously the slots 42 of the hollow pipe 36 are sequentially contracted and folded so that the shock in a collision can be easily attenuated.

In this process, the operation of absorbing a shock can be smoothly achieved even in a low-speed collision, because the allowable load for absorbing a shock in a collision was lowered than the standard level by the slots 42 formed through the metallic hollow pipe 36 of the crash box and contracting against a shock.

Figure 7:
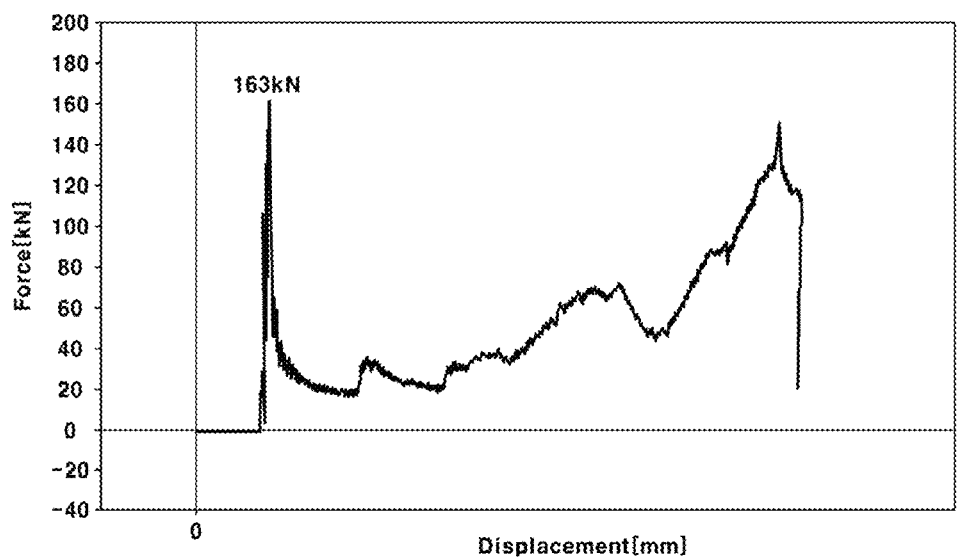
FIG. 7 is a graph showing an allowable load for absorbing a shock of an exemplary hybrid crash box for a vehicle according to the present invention.
Figure 8:
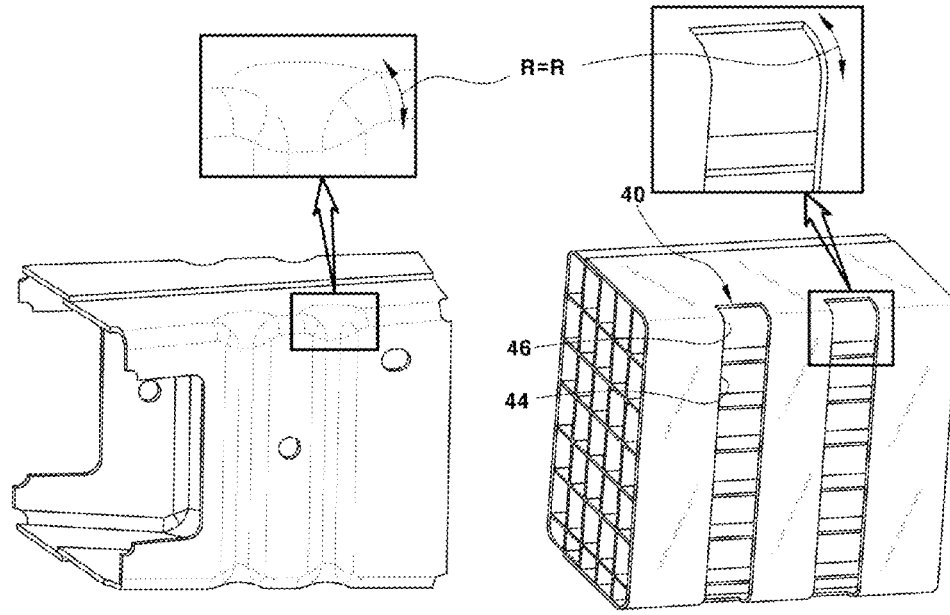
FIG. 8 is a view comparing the slot structure of an exemplary hybrid crash box for a vehicle according to the present invention with an existing bead structure.

That is, as shown in the graph of FIG. 7, since the slots 42 are formed through the hollow pipe 36, a load (about 163 kN) within the standard level of an allowable load for absorbing a shock in a collision is generated, such that the operation of absorbing a shock of the crash box can be smoothly achieved even against the shock in a low-speed collision.

On the other hand, the reason of including the curve section holes 46, which are formed on the rounded edges of the top, bottom, left, and right sides of the hollow pipe 36, in the slots 42, other than the straight section holes 44 is for achieving the same effect of contraction as in a shock on the existing beads by fitting the shapes as much as possible to the shapes of the curved surfaces formed at the upper and lower ends of the beads 26 of the existing corrugated pipe 22.

As described above, since holes formed through a metallic hollow pipe have been formed integrally with plastic lattices by injection molding, a plurality of slots vertically elongated is formed at substantially regular intervals to be contracted by a shock like the beads of the existing hollow corrugated pipes, it is possible to decrease an allowable load for absorbing a shock in a collision lower than the existing levels, and it is also possible to achieve a smooth shock-absorbing operation even against a shock in a low-speed collision with the decrease of the allowable load.

For convenience in explanation and accurate definition in the appended claims, the terms "upper" or "lower", "left" or "right", "vertical" or "horizontal", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid crash box for a vehicle, comprising:
a latticed box pipe connected with a bumper beam; and
a mount mounted on a bumper stay;
wherein the latticed box pipe includes a metallic hollow pipe and plastic lattices integrally formed in the metallic hollow pipe by injection molding, and
wherein a plurality of holes that contract against a shock to absorb the shock are formed at predetermined positions through the metallic hollow pipe,
wherein the holes are formed in a shape or shapes of slots vertically elongated, substantially perpendicular to a front-rear longitudinal direction of the metallic hollow pipe, and
wherein the holes are divided into straight section holes formed through top, bottom, left, and right sides of the metallic hollow pipe and curve section holes elongated up to rounded edges that are joints of the top, bottom, left, and right sides of the metallic hollow pipe, each corresponding straight section hole and curve section hole being connected each other.

2. The hybrid crash box of claim 1, wherein the holes are formed in a shape or shapes of polygons at substantially regular intervals through two or more sides selected from top, bottom, left, and right sides of the metallic hollow pipe.

3. A hybrid crash box for a vehicle, comprising:
a latticed box pipe connected with a bumper beam; and
a mount mounted on a bumper stay;
wherein the latticed box pipe includes a metallic hollow pipe and plastic lattices integrally formed in the metallic hollow pipe by injection molding,
wherein a plurality of holes that contract against a shock to absorb the shock are formed at predetermined positions through the metallic hollow pipe,
wherein the holes are formed in a shape or shapes of polygons at substantially regular intervals through two or more sides selected from top, bottom, left, and right sides of the metallic hollow pipe, and
wherein the holes are divided into straight section holes formed through top, bottom, left, and right sides of the hollow pipe and curve section holes elongated up to rounded edges that are joints of the top, bottom, left, and right sides of the metallic hollow pipe, each corresponding straight section hole and curve section hole being connected each other.

\* \* \* \* \*